United States Patent
Kotani

(10) Patent No.: US 8,089,536 B2
(45) Date of Patent: Jan. 3, 2012

(54) IMAGE PROCESSING APPARATUS, IMAGE PROCESSING METHOD, AND PROGRAM

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 11/622,071

(22) Filed: Jan. 11, 2007

(65) Prior Publication Data

US 2007/0159539 A1 Jul. 12, 2007

(30) Foreign Application Priority Data

Jan. 12, 2006 (JP) ................. 2006-005397

(51) Int. Cl.
H04N 9/64 (2006.01)
H04N 5/238 (2006.01)
(52) U.S. Cl. ....................... 348/246; 348/363
(58) Field of Classification Search .................. 348/241, 348/246, 248, 251, 363, 360, 243, 335, 125; 382/275, 300
See application file for complete search history.

(56) References Cited

U.S. PATENT DOCUMENTS

| | | | |
|---|---|---|---|
| 6,940,550 B2 * | 9/2005 | Kitawaki et al. | 348/246 |
| 7,295,233 B2 * | 11/2007 | Steinberg et al. | 348/241 |
| 7,358,994 B2 | 4/2008 | Yano | |
| 7,590,305 B2 * | 9/2009 | Steinberg et al. | 382/275 |
| 7,853,097 B2 * | 12/2010 | Ishiga | 382/275 |
| 2002/0093577 A1 * | 7/2002 | Kitawaki et al. | 348/241 |
| 2004/0021779 A1 | 2/2004 | Yano | |
| 2004/0041926 A1 | 3/2004 | Takano et al. | |
| 2005/0068452 A1 | 3/2005 | Steinberg et al. | |

FOREIGN PATENT DOCUMENTS

| | | |
|---|---|---|
| GB | 2395781 A | 6/2006 |
| JP | 2001-223894 | 8/2001 |
| JP | 2004-062651 | 2/2004 |
| JP | 2004-193729 A | 7/2004 |
| JP | 2004-222231 | 8/2004 |

OTHER PUBLICATIONS

The above reference was cited in a Jan. 15, 2010 Chinese Office Action, which is not enclosed, that issued in Chinese Patent Application No. 200710000579.1, which is a counterpart application of the related U.S. Appl. No. 11/622,087.

The above reference was cited in a Oct. 29, 2009 US Office Action that issued in related U.S. Appl. No. 11/622,087.

(Continued)

*Primary Examiner* — David Ometz
*Assistant Examiner* — Ahmed A Berhan
(74) *Attorney, Agent, or Firm* — Cowan, Liebowitz & Latman, P.C.

(57) ABSTRACT

An image processing apparatus includes an information extraction unit which extracts foreign substance information which is information of a position and size of a foreign substance in an image sensing plane of an image capture unit and is recorded in association with captured image data and lens information of a lens used when acquiring the captured image data, which is recorded in association with the captured image data, a conversion unit which converts the foreign substance information extracted by the information extraction unit into second foreign substance information form on the basis of the lens information extracted by the information extraction unit, and an interpolation unit which interpolates a pixel corresponding to the foreign substance in the captured image data on the basis of the second foreign substance information form.

5 Claims, 13 Drawing Sheets

OTHER PUBLICATIONS

The above reference was cited in a May 26, 2010 U.S. Office Action issued in related U.S. Appl. No. 11/622,087.
The above references was cited in a European Search Report issued on Aug. 31, 2011, that issued in related European Patent Application No. 07100433.7.

The above references were cited in a European Search Report issued on Mar. 2, 2011, that issued in the corresponding European Patent Application No. 07100434.5.

* cited by examiner

F I G. 2
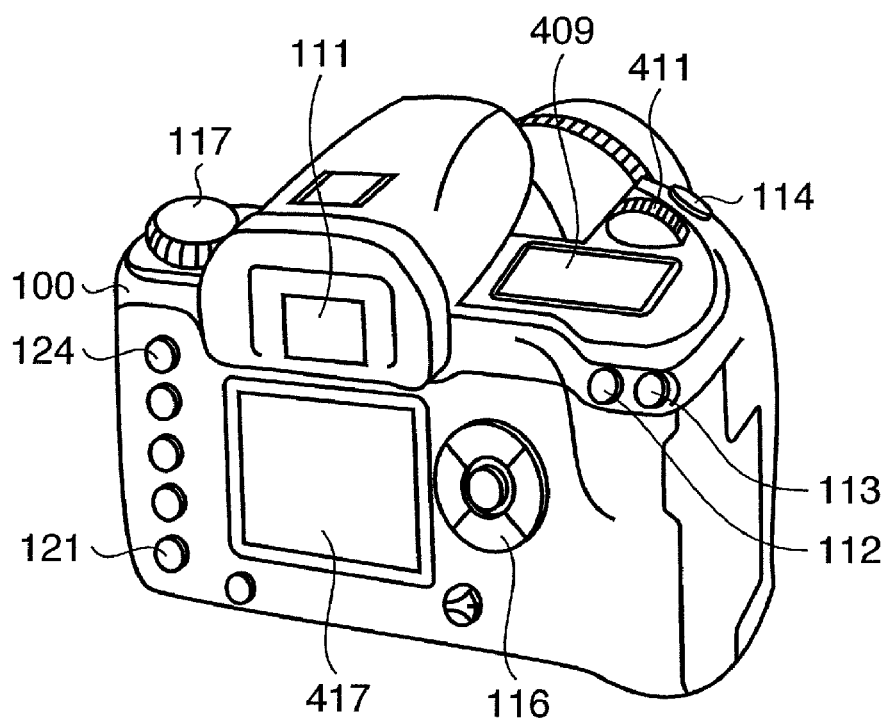

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>    RADIUS (2 BYTES)<br>        X-COORDINATE OF CENTER (2 BYTES)<br>        Y-COORDINATE OF CENTER (2 BYTES) |
| | | PARAMETERS OF DUST REGION $D_2$ |
| | | ... |
| | | PARAMETERS OF DUST REGION $D_n$ |

IMAGE PROCESSING APPARATUS, IMAGE PROCESSING METHOD, AND PROGRAM

BACKGROUND OF THE INVENTION

1. Field of the Invention

The present invention relates to a technique of suppressing degradation of image quality caused by a foreign substance sticking to the surface of, for example, an optical low-pass filter in an image capturing apparatus using an image sensor such as a CCD or CMOS sensor.

2. Description of the Related Art

In recent years, many image capturing apparatus that generate an image signal by using an image sensor such as a CCD and record it as data are on the market, including digital cameras and digital video cameras. A digital camera requires no sensitive film that is conventionally used as a recording medium and instead records image data on a data recording medium such as a semiconductor memory card or hard disk device. Such a data recording medium allows repeated write and erase, unlike a film, and is very convenient due to a large reduction in the cost of related expendables.

A digital camera usually has an LCD (Liquid Crystal Display) monitor device capable of displaying a captured image, as needed, and a detachable mass storage device.

Use of a digital camera having these two devices makes it possible to capture an image without using film, which conventionally serves as an expendable recording medium, to display the captured image on the LCD monitor device and to confirm its content immediately. It is possible to erase undesired image data on the spot or capture another image, as needed. When compared to a silver halide camera, the recording efficiency is much higher.

The scope in which digital cameras are being used is widening due to their convenience as well as to technical innovations, for example, which increase the number of pixels of an image sensor. There have also been recent increases in the number of digital cameras with interchangeable lenses, such as those of single-lens reflex cameras.

However, in digital cameras, foreign substances such as dust or dirt (to be simply referred to as dust hereinafter) sometimes stick to the surface of, for example, an image sensor, an image sensor protective glass fixed on the image sensor, or to an optical filter or an optical system (to be referred to hereinafter as an image sensor/optical system component). If dust sticks to an image sensor/optical system component, the dust shields light and impedes image capture of that part, degrading the quality of the captured image.

Not only digital cameras but cameras using silver halide film also have the problem of dust being captured on film. However, since the film moves with every frame, the same dust is rarely captured on all frames.

However, the image sensor of a digital camera does not move, and image capture is executed using the same image sensor. Once dust sticks to an image sensor/optical system component, the same dust is captured on many frames (captured images). In particular, a lens-interchangeable digital camera readily catches dust in it upon lens exchange.

Hence, the photographer must always take care not to cause dust to stick to the image sensor/optical system component and must expend great effort to check for dust and remove it. In particular, the image sensor is located at a relatively deep point within the camera, and it is not easy to check and remove dust on it.

Dust easily enters a lens-interchangeable digital camera when lenses are exchanged. Many lens-interchangeable digital cameras have a focal plane shutter in front of the image sensor and it is easy for dust to stick to the image sensor/optical system component.

Dust on the image sensor normally sticks not to the surface of the image sensor but to the surface of the protective glass or optical filter. Hence, the imaging state changes depending on the aperture value of the photographing lens or the distance of the pupil position. More specifically, when the aperture value is close to a full-aperture state, defocusing occurs to make small dust unnoticeable. Conversely, when the aperture value is large, focusing on dust occurs and has an adverse effect on the image.

There is known a method of making dust unnoticeable, in which, for example, a white wall is captured in a stopped-down-aperture state to prepare an image containing only dust on the image sensor in advance, and the image is used in combination with a normal image (Japanese Patent Laid-Open No. 2004-222231). With this method, however, the user must always be aware of the correspondence between the image captured for dust detection and the group of actually captured images to be associated with the image; the result is cumbersome.

SUMMARY OF THE INVENTION

The present invention has been made in consideration of the above-described problems, and has as its object to suppress the influence on a captured image even when dust sticks to an image sensor, a protective glass fixed on the image sensor, or a filter.

According to a first aspect of the present invention there is provided an image processing apparatus comprising an information extraction unit configured to extract foreign substance information that is information of a position and size of a foreign substance in an image sensing plane of an image capture unit and is recorded in association with captured image data and lens information of a lens used when acquiring the captured image data, which is recorded in association with the captured image data, a conversion unit configured to convert the foreign substance information extracted by the information extraction unit into second form of foreign substance information on the basis of the lens information extracted by the information extraction unit, and an interpolation unit configured to interpolate a pixel corresponding to the foreign substance in the captured image data on the basis of the second form of foreign substance information.

According to a second aspect of the present invention there is provided an image processing method comprising steps of extracting foreign substance information which is information regarding the position and size of a foreign substance in an image sensing plane of image capture unit and is recorded in association with captured image data and lens information of a lens used when acquiring the captured image data, which is recorded in association with the captured image data, converting the foreign substance information extracted in the information extracting step into second foreign substance information form on the basis of the lens information extracted in the information extracting step, and interpolating a pixel corresponding to the foreign substance in the captured image data on the basis of the second foreign substance information form.

According to the third aspect of the present invention, there is provided a program causing a computer to execute the above image processing method.

According to the present invention, it is possible to suppress the influence on a captured image even when dust sticks to an image sensor, a protective glass fixed on the image sensor, or a filter.

Further features of the present invention will become apparent from the following description of exemplary embodiments with reference to the attached drawings.

BRIEF DESCRIPTION OF THE DRAWINGS

FIG. 2 is a perspective view showing the outer appearance of the digital camera according to the first embodiment;

FIG. 5 is a view showing a data format example of dust correction data;

DESCRIPTION OF THE EMBODIMENTS

Preferred embodiments of the present invention will be described below in detail with reference to the accompanying drawings.

First Embodiment

In this embodiment, a case will be described in which a camera body detects dust and attaches dust correction data to image data, and an image processing apparatus outside the camera executes processing to remove the dust from the image data by using the dust correction data attached to the image data.

Figure 1:
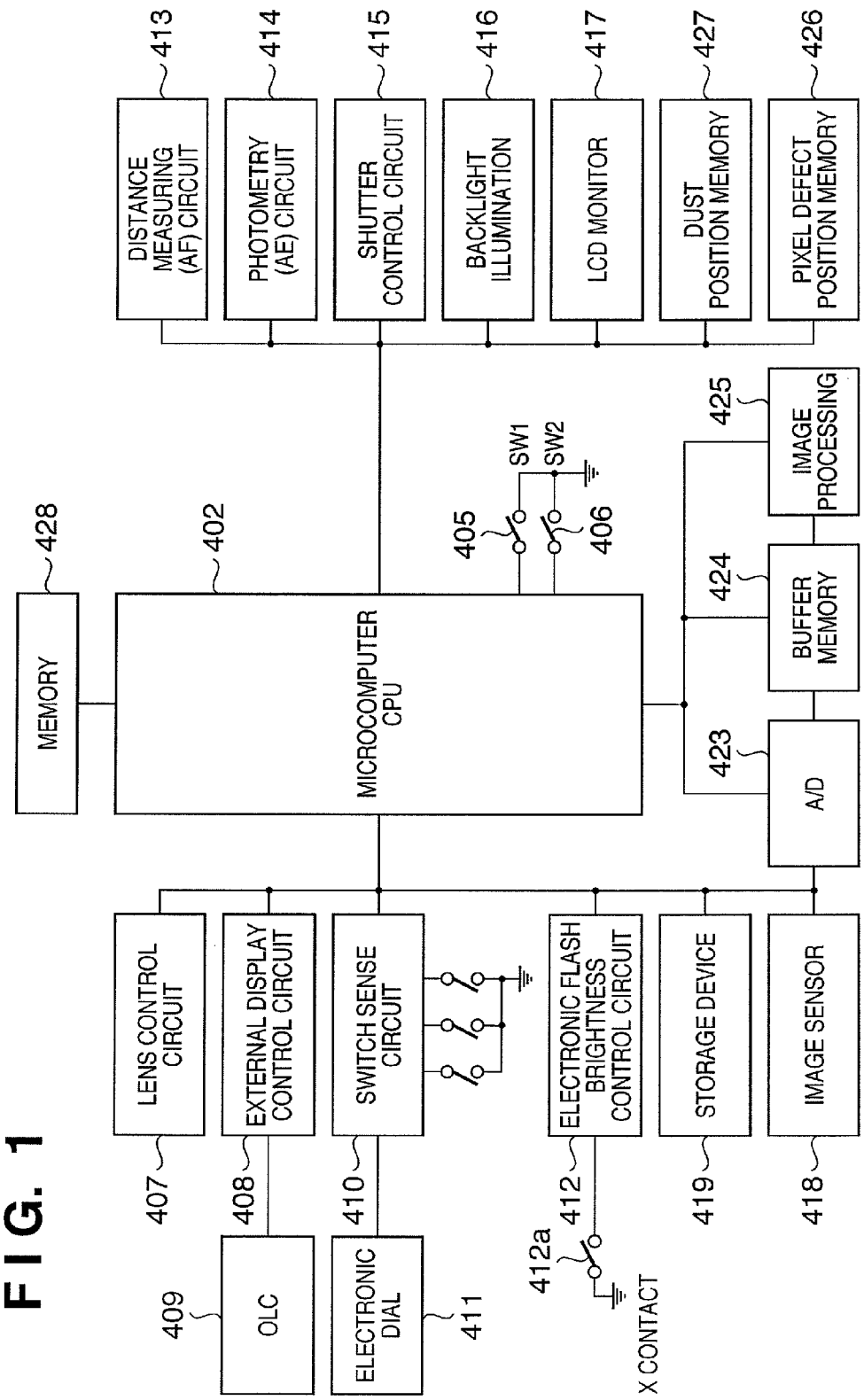
FIG. 1 is a block diagram showing the circuit arrangement of a lens-interchangeable single-lens reflex digital camera, which serves as an image capturing apparatus according to the first embodiment of the present invention.

FIG. 1 is a block diagram showing the circuit arrangement of a lens-interchangeable single-lens reflex digital camera which serves as an image capturing apparatus according to the first embodiment of the present invention.

Referring to FIG. 1, a microcomputer 402 controls the operation of the entire camera, including processing of image data output from an image sensor (CCD in this embodiment) 418 and display on an LCD monitor device 417.

A switch (SW1) 405 is turned on in a half depressed state of a release button 114 (FIG. 2). When the switch (SW1) 405 is ON, the digital camera of this embodiment is ready for image capturing. A switch (SW2) 406 is turned on in a fully depressed state of the release button 114. When the switch (SW2) 406 is turned on, the digital camera of this embodiment starts image capturing.

A lens control circuit 407 communicates with a photographing lens 200 (FIG. 3) and controls driving of the photographing lens 200 and driving of the aperture blades upon AF (Auto Focus).

Referring to FIG. 1, an external display control circuit 408 controls an external display device (OLC) 409 and a display device (not shown) in the viewfinder. A switch sense circuit 410 transmits, to the microcomputer 402, signals from a number of switches including an electronic dial 411 provided on the camera.

An electronic flash brightness control circuit 412 is grounded via an X contact 412a and controls an external electronic flash. A distance measuring circuit 413 detects a defocus amount with respect to an object for AF. A photometry circuit 414 measures the brightness of an object.

A shutter control circuit 415 controls a shutter to execute proper exposure for the image sensor. The LCD monitor device 417 and a backlight illumination device 416 constitute an image display device. A storage device 419 includes, for example, a hard disk drive or a semiconductor memory card detachable from the camera body.

Connected to the microcomputer 402 are an A/D converter 423, an image buffer memory 424, an image processing circuit 425 including a digital signal processor (DSP), and a pixel defect position memory 426 to store information representing the fact that a predetermined pixel itself in the image sensor has a defect. A dust position memory 427 to store a pixel position in the image sensor where an image error occurs due to dust also connects to the microcomputer 402. The pixel defect position memory 426 and dust position memory 427 preferably use a nonvolatile memory. The pixel defect position memory 426 and dust position memory 427 may store data by using different addresses of the same memory space.

A nonvolatile memory 428 stores, for example, programs to be executed by the microcomputer 402.

Figure 3:
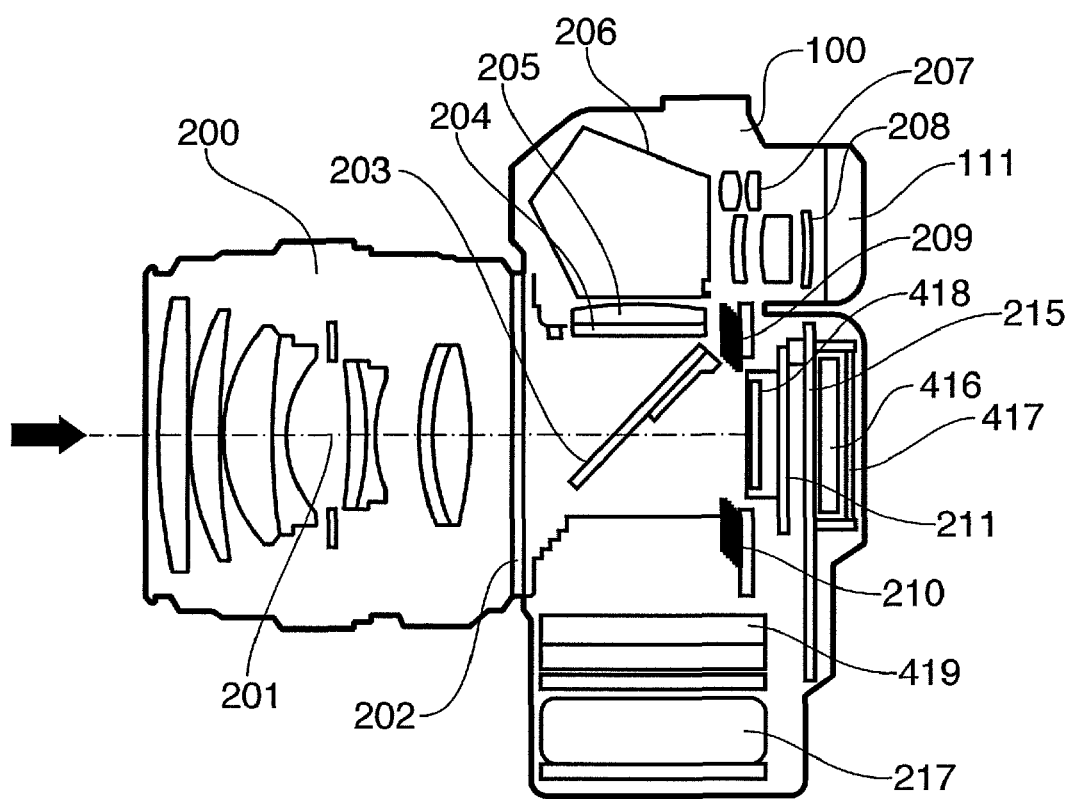
FIG. 3 is a longitudinal sectional view showing the internal structure of the digital camera according to the first embodiment.

FIG. 2 is a perspective view showing the outer appearance of the digital camera according to this embodiment. FIG. 3 is a longitudinal sectional view of FIG. 2.

Referring to FIG. 2, a camera body 100 has, on its upper side, an eyepiece window 111 for viewfinder observation, an AE (Automatic Exposure) lock button 112, an AF distance measuring point selection button 113, and the release button 114 for the image capture operation. The electronic dial 411, image capture mode selection dial 117, and external display device 409 are also provided. The electronic dial 411 is a multifunction signal input device that inputs a numerical value to the camera or switches the image capture mode in cooperation with other operation buttons. The external display device 409 including a liquid crystal display device displays image capture conditions such as shutter speed, aperture value, and image capture mode as well as other information.

The camera body 100 has, on its rear surface, the LCD monitor device 417 to display a captured image and various kinds of settings windows, a monitor switch 121 to turn on/off the LCD monitor device 417, a cursor switch 116, and a menu button 124.

The cursor switch 116 has four buttons arranged on the upper, lower, left, and right sides and a SET button arranged at the center. The user uses the cursor switch 116 to instruct the camera to select or execute a menu item displayed on the LCD monitor device 417.

The menu button 124 displays, on the LCD monitor device 417, a menu window to configure various settings of the camera. To select and set, for example, the image capture mode, the user presses the menu button 124, selects a desired mode by operating the upper, lower, left, and right buttons of the cursor switch 116, and presses the SET button while keeping the desired mode selected, thereby completing the setting. The menu button 124 and cursor switch 116 are also used to set a dust mode (to be described later) and set a display mode and identification mark in the dust mode.

The LCD monitor device 417 of this embodiment is of a transparent type such that the user cannot visually verify any image merely by the driving of the LCD monitor device—the LCD monitor device 417 requires the backlight illumination device 416 on its rear side, as shown in FIG. 3. The LCD monitor device 417 and backlight illumination device 416 constitute an image display device.

As shown in FIG. 3, the photographing lens 200 of the image capture optical system is detachably mounted on the camera body 100 via a lens mount 202. Referring to FIG. 3, reference numeral 201 denotes an image capture optical axis; and 203, a quick return mirror.

The quick return mirror 203 arranged in the image capture optical path is movable between a position (position shown in FIG. 3 which will be referred to as an inclined position) to guide object light from the photographing lens 200 to the viewfinder optical system and a position (to be referred to as a retreat position) to retreat from the image capture optical path.

Referring to FIG. 3, an image of object light guided from the quick return mirror 203 to the viewfinder optical system is formed on a focusing screen 204. A condenser lens 205 improves the visibility of the viewfinder. A pentagonal roof prism 206 guides the object light that has passed through the focusing screen 204 and condenser lens 205 to an eyepiece 208 for viewfinder observation and a photometry sensor 207.

A shutter includes a front curtain 209 and a rear curtain 210. When the front curtain 209 and rear curtain 210 are open, the image sensor 418 serving as a solid-state image sensor arranged on the rear side is exposed for a necessary period of time. A captured image is converted into an electrical signal for each pixel by the image sensor is processed by the A/D converter 423 and image processing circuit 425 and recorded in the storage device 419 as image data.

The image sensor 418 is held on a printed circuit board 211. Another printed circuit board (i.e., a display board 215) is arranged on the rear side of the printed circuit board 211. The LCD monitor device 417 and backlight illumination device 416 are arranged on the opposite surface of the display board 215.

The storage device 419 records image data. Reference numeral 217 denotes a battery (portable power supply). The storage device 419 and battery 217 are detachable from the camera body.

(Oust Detection Processing)

Figure 4:
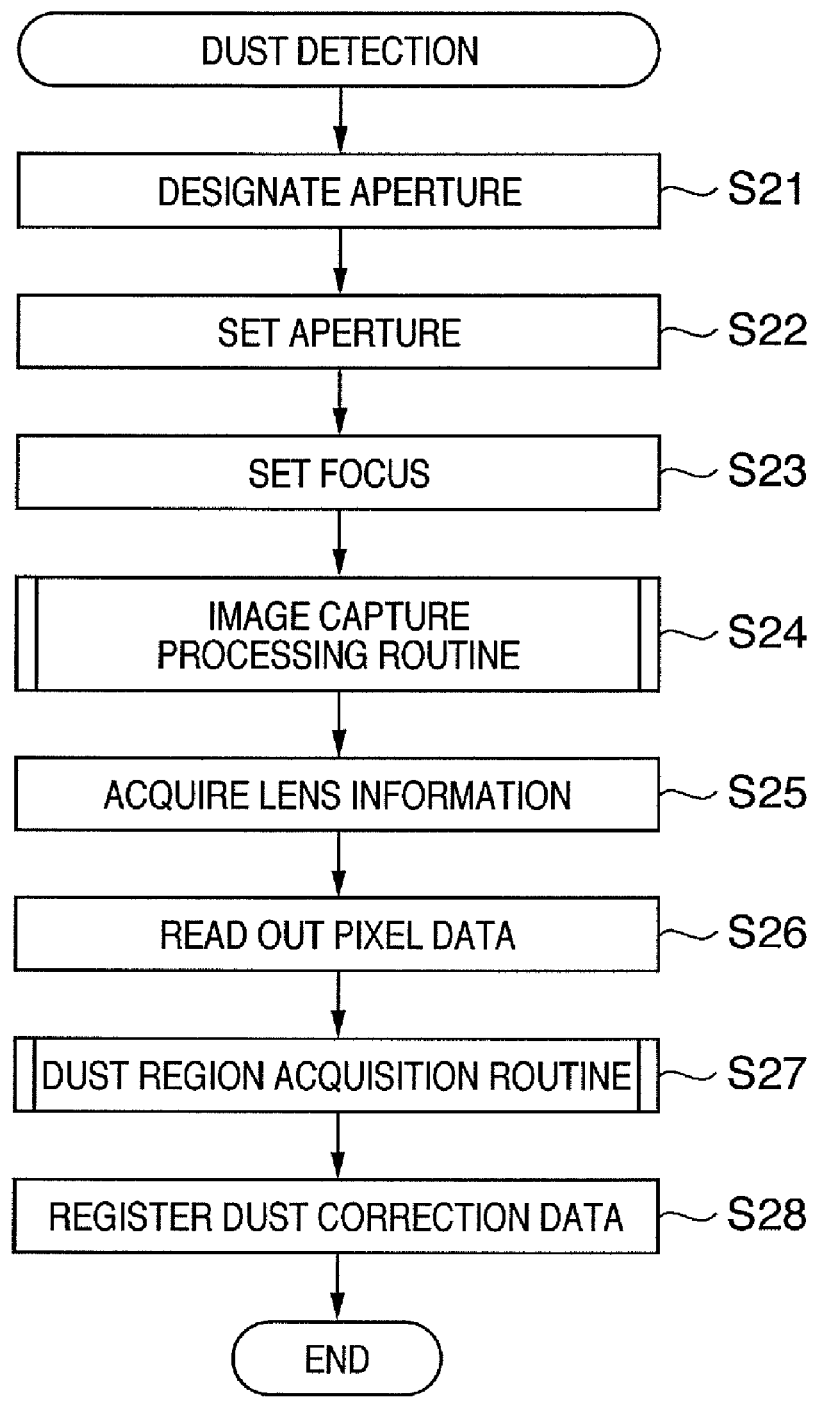
FIG. 4 is a flowchart for explaining the dust detection processing of the digital camera according to the first embodiment.

FIG. 4 is a flowchart explaining dust detection processing (processing of detecting a pixel position where an image error occurs due to dust) of the digital camera according to this embodiment. This processing is done by causing the microcomputer 402 to execute a dust detection processing program stored in the memory 428.

Dust detection processing is executed by capturing a dust detection image. To perform dust detection processing, the camera is installed while keeping the image capture optical axis 201 of the photographing lens 200 directed toward a surface with a uniform color such as the illuminated surface of an area light source or a white wall, thereby preparing for dust detection. Alternatively, a light unit (a small point source device attached in place of a lens) for dust detection is attached to the lens mount 202 to prepare for dust detection. The light unit can employ, for example, a white LED as its light source and preferably adjusts the light-emitting surface size in correspondence with a predetermined aperture value (e.g., F64 in this embodiment).

In the example of this embodiment, we have explained dust detection with regard to a standard photographing lens, however dust detection may also be performed by attaching the light unit to the lens mount 202. In this embodiment, the dust detection image is an image having a uniform color, as described above.

When preparation is finished and the user inputs a dust detection processing start instruction (e.g., from, the cursor switch 116), the microcomputer 402 first sets the aperture. Dust near the image sensor changes the image formation state depending upon the aperture value of the lens, and the position of dust changes depending upon the lens pupil position. Accordingly, dust correction data must hold the aperture value and the lens pupil position upon detection in addition to the position and size of the dust.

If it is predetermined to always use the same aperture value independent of the lens in generating dust correction data, the dust correction data need not always hold the aperture value. In addition, it is also unnecessary to hold the pupil position in the dust correction data if the light unit is used, or only use of a specific lens is permitted. In other words, if use of a plurality of lenses is permitted, or the aperture value is to be changed as needed, it is necessary to hold, in the dust correction data, the aperture value and the lens pupil position upon detection. The pupil position indicates the distance from the image sensing plane (focal plane) of the exit pupil.

For example, F16 is designated (step S21).

The microcomputer 402 causes the lens control circuit 407 to control the aperture blades of the photographing lens 200 to set the aperture to the aperture value designated in step S21 (step S22). In addition, the microcomputer 402 sets the focus position to the infinite distance (step S23).

When the aperture value and focus position of the photographing lens are set, image capturing in dust detection mode is executed (step S24). The image capture processing routine executed in step S24 will be described later in detail with reference to FIG. 9. Obtained image data is stored in the image buffer memory 424.

When image capturing ends, the aperture value and lens pupil position at image capture time are acquired (step S25). Data corresponding to each pixel of the captured image stored in the image buffer memory 424 is loaded to the image processing circuit 425 (step S26). The image processing circuit 425 executes processing shown in FIG. 6 to acquire the positions and size of pixels with dust (step S27). The positions and size of the pixels with dust acquired in step S27 and the aperture value and lens pupil position information acquired in step S25 are registered in the dust position memory 427 (step S28). If the above-described light unit is used, no lens information can be acquired. If no lens information is acquired, it is determined that the light unit was used. In this case, predetermined lens pupil position information and a reduced aperture value calculated from the light source diameter of the light unit are registered.

In step S28, the position of each defective pixel (pixel defect) in manufacturing, which is recorded in the pixel defect position memory in advance, is compared with the position of each readout pixel data to confirm whether a pixel defect is present. The position of only a region determined to have a defect other than a pixel defect is registered in the dust position memory 427.

FIG. 5 is a view showing a data format example of dust correction data stored in the dust position memory 427. As shown in FIG. 5, lens information and information representing the position and size of dust at detection image capture time are stored as dust correction data. The dust correction data is added to an image together with the information of image data at image capture time and used by dust removal processing to be described later.

More specifically, an actual aperture value (F-number) and lens pupil position at detection image capture time are stored as lens information at detection image capture time. The number (integral value) of detected dust regions is stored in the storage area. Then, individual parameters of each dust region are stored repeatedly in correspondence with the number of dust regions. The dust region parameters include a set of three numerical values: the radius (e.g., 2 bytes) of dust, the x-coordinate (e.g., 2 bytes) of the center of the effective image region, and the y-coordinate (e.g., 2 bytes) of the center.

If the dust correction data size is restricted, for example, by the capacity of the dust position memory 427, data are preferentially stored in the chronological order of dust regions obtained in step S27. This is because the dust region acquisition routine in step S27 sorts the dust regions in descending order of visibility.

(Dust Region Acquisition Routine)

The dust region acquisition routine in step S27 will be described next in detail with reference to FIGS. 6 to 8.

Figure 7:
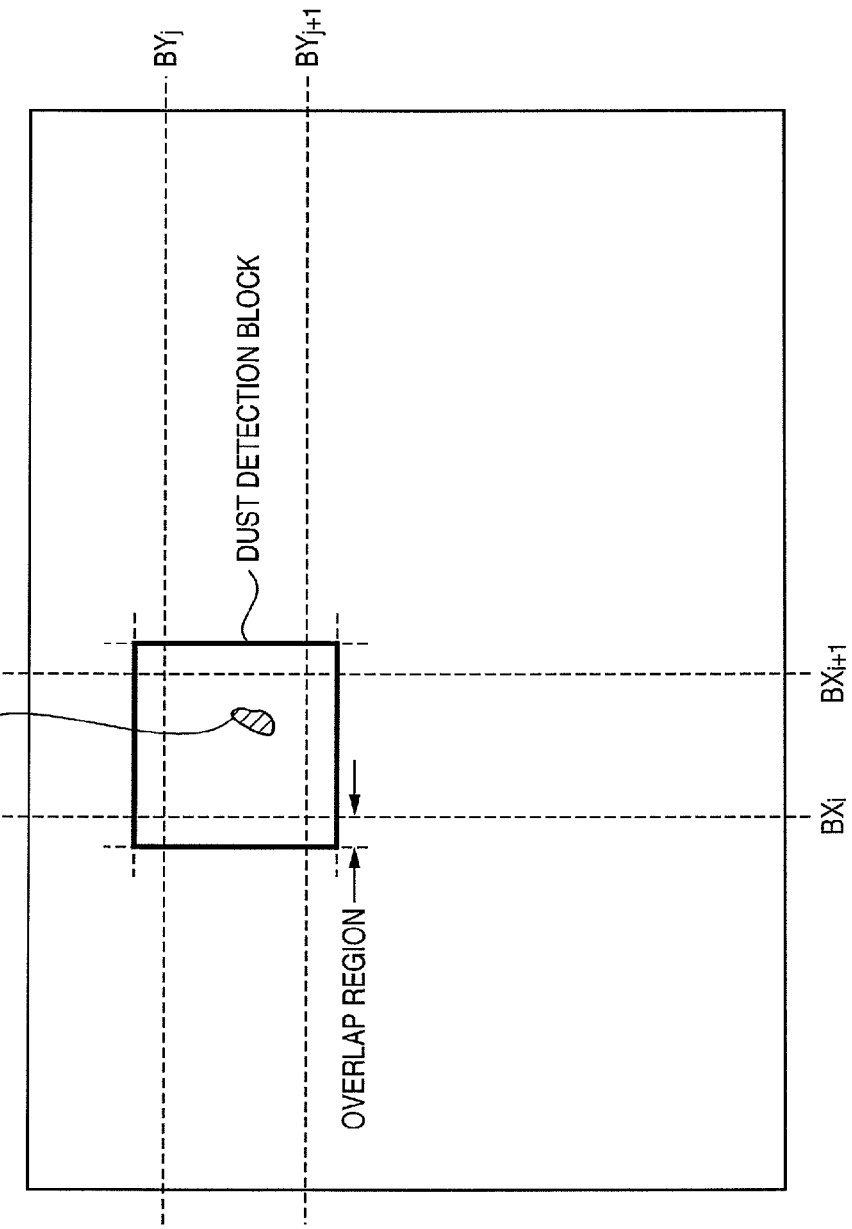
FIG. 7 is a view showing the process unit of dust region determination processing in step S62 of FIG. 6.

As shown in FIG. 7, readout image data is rasterized on the memory, and each predetermined block is processed. The image data is segmented into blocks to cope with limb darkening caused by the lens or sensor characteristic. Limb darkening is a phenomenon in which the brightness of the peripheral portion of a lens decreases with respect to the central portion. It is known that the limb darkening phenomenon decreases proportionally with greater aperture stop-down. However, even at such decreased aperture states, it is impossible for some lenses to accurately detect dust at the peripheral portion if the dust position is determined on the basis of a threshold value predetermined for a captured image. In order to prevent this and reduce the influence of limb darkening, image data is segmented into blocks.

Simple block segmentation poses a problem such that if the threshold value changes between blocks, the dust detection position across the blocks becomes inaccurate. In order to prevent this, the blocks are overlapped, and a pixel determined to be dust in any one of the blocks included in the overlap region is handled as a dust region, Dust region determination in a block is done in accordance with the procedure shown in FIG. 6. A maximum brightness Lmax and an average brightness Lave in the block are calculated. A threshold value T1 in the block is calculated using the following equation.

$$T1 = Lave \times 0.6 + Lmax \times 0.4$$

A pixel having a brightness value smaller than the threshold value is regarded as a dust pixel (step S61). An isolated region formed by dust pixels is defined as one dust region di (i=0, 1, ..., n) (step S62). As shown in FIG. 8, for each dust region, a maximum value Xmax and minimum value Xmin of the horizontal coordinates of the pixels included in the dust region and a maximum value Ymax and minimum value Ymin of the vertical coordinates are obtained. A radius ri representing the size of the dust region di is calculated using the following equation (step S63).

$$ri = \sqrt{[\{(Xmax - Xmin)/2\}^2 + \{(Ymax - Ymin)/2\}^2]}$$

Figure 8:
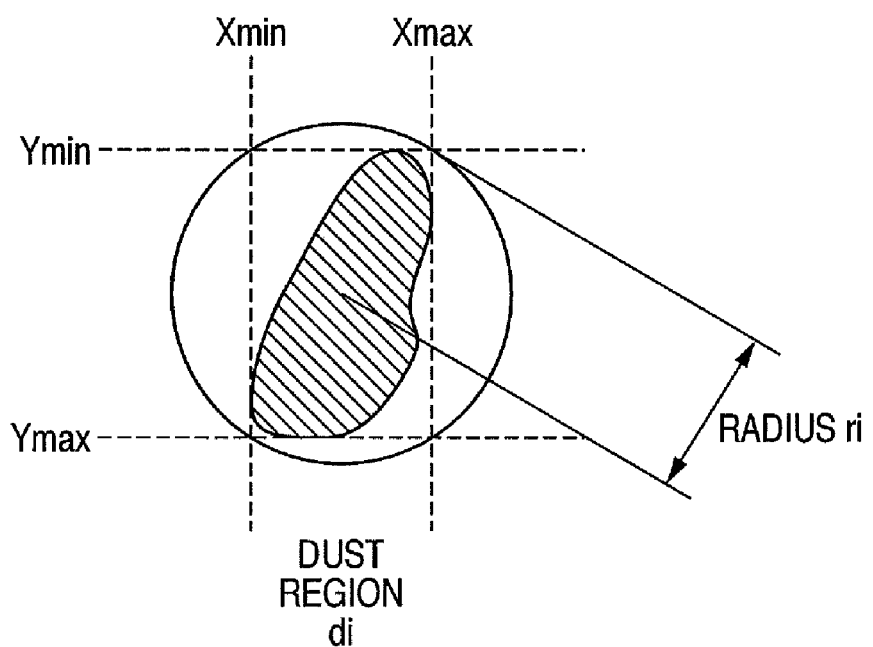
FIG. 8 is a view showing the outline of dust region size calculation in step S63 of FIG. 6.

FIG. 8 shows the relationship between Xmax, Ymax, Xmin, Ymin, and ri.

In step S64, the average brightness value of each dust region is calculated.

In some cases, the dust correction data size is restricted by, for example, the capacity of the dust position memory 427. To cope with such a case, the pieces of dust position information are sorted on the basis of the sizes or average brightness values of the dust regions (step S65). In this case, sorting is done in descending order of ri. If ri is the same, sorting is done in ascending order of average brightness values. This allows to preferentially register noticeable dust in the dust correction data. Let Di be a sorted dust region, and Ri be the radius of the dust region Di.

If a dust region larger than a predetermined size is present, it may be excluded from the sorting target and located at the end of the sorted dust region list. A large dust region may degrade image quality in interpolation processing later and is therefore preferably handled as a correction target with the lowest priority.

(Image Capture Processing Routine)

Figure 9:
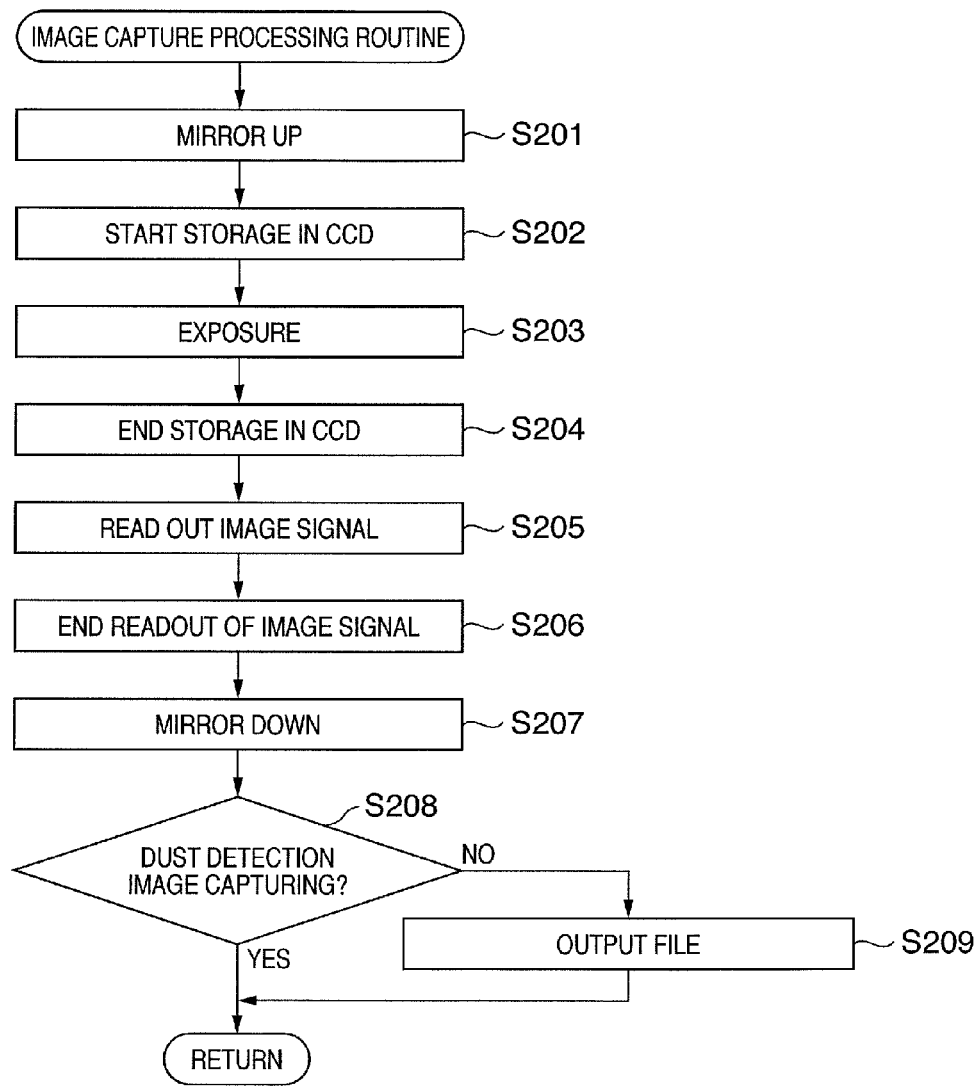
FIG. 9 is a flowchart for explaining details of an image capture processing routine in step S24 of FIG. 4.

The image capture processing routine in step S24 of FIG. 4 will be described next with reference to the flowchart in FIG. 9. This processing is done by causing the microcomputer 402 to execute an image capture processing program stored in the memory 428.

When the image capture processing routine starts, the microcomputer 402 actuates the quick return mirror 203 shown in FIG. 3 to do so-called mirror-up in step S201 and make the quick return mirror 203 retreat from the image capture optical path.

In step S202, the image sensor starts storing charges. In step S203, the rear curtain 210 and front curtain 209 of the shutter shown in FIG. 3 are opened to execute exposure. In step S204, the image sensor ends charge storage. In step S205, the image signal is read out from the image sensor and processed by the A/D converter 423 and image processing circuit 425. The resultant image data is primarily stored in the image buffer memory 424.

When readout of all image signals from the image sensor is complete in step S206, the quick return mirror 203 is moved down in step S207 and returned to the inclined position, thereby ending the series of image capture operations.

In step S208, it is determined whether the operation is a normal image capture event or a dust detection image capture event. If it is a normal image capture event, the process advances to step S209 to record, in the storage device 419, the dust correction data shown in FIG. 5 together with the camera setting values upon image capture in association with the image data.

More specifically, data association can be attained by additionally writing the dust correction data in, for example, an Exif region serving as the header region of an image file where the camera setting values upon image capture are recorded. Data association may also be attained by recording the dust correction data as an independent file and recording, in the image data, only link information to the dust correction data file. However, if the image file and dust correction data file are separately recorded* the link relationship may be lost if an image file is moved. Therefore, the dust correction data is preferably held integrally with the image data.

(Dust Removal Processing)

The procedure of dust removal processing will be described next. Dust removal processing is done not in the camera body but on a separately prepared image processing apparatus.

Figure 10:
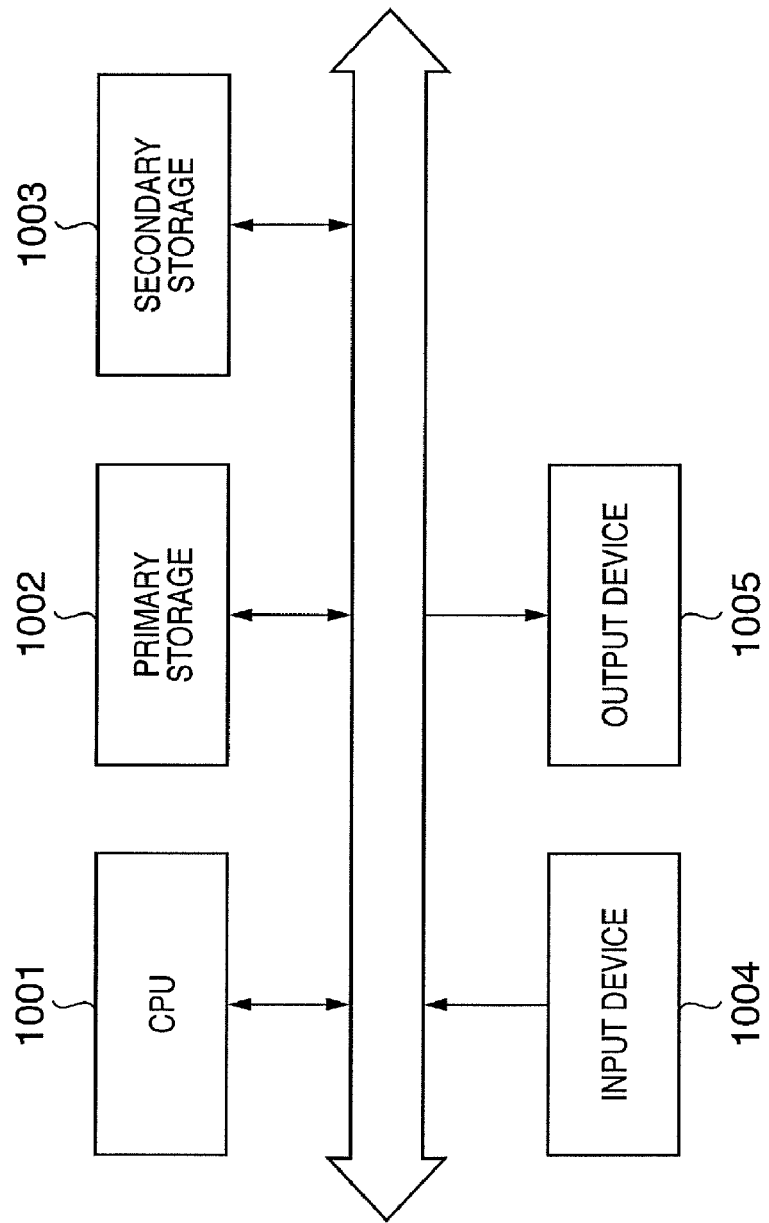
FIG. 10 is a block diagram showing the schematic system configuration of an image processing apparatus.

FIG. 10 is a block diagram showing the schematic system configuration of the image processing apparatus.

A CPU 1001 controls the operation of the whole system and executes, for example, a program stored in a primary storage unit 1002. The primary storage unit 1002 is mainly composed of a memory, and reads programs out from a secondary storage unit 1003 and stores them. The secondary storage unit 1003 corresponds to, for example, a hard disk. The capacity of the primary storage unit is generally smaller than that of the secondary storage unit. The secondary storage unit stores programs and data of size beyond the capacity of the primary storage unit. The secondary storage unit also stores data that requires long-term storage. In this embodiment, the secondary storage unit 1003 stores a program. To execute the program, the primary storage unit 1002 reads it out, and the CPU 1001 executes processing.

An input device 1004 corresponds, for example, to not only a mouse and keyboard used for system control but also a card reader, scanner, and film scanner necessary for inputting image data. Examples of an output device 1005 are a monitor and a printer. This apparatus can take various forms except that described above, though a description thereof will be omitted because it is outside the scope of the present invention.

The image processing apparatus has an operating system capable of executing a plurality of programs in parallel. The operator can operate a program running on this apparatus by using a Graphical User Interface (GUI).

Figure 11:
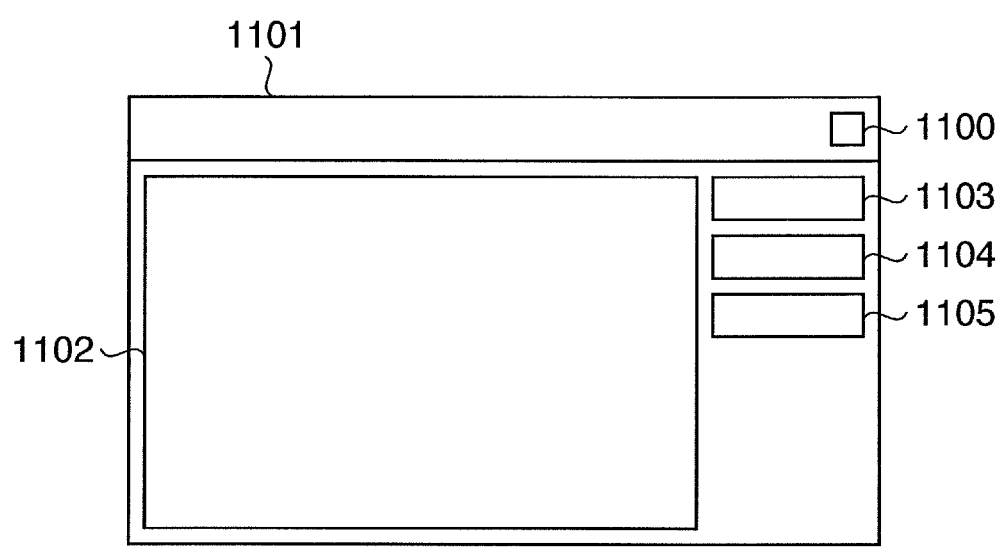
FIG. 11 is a view showing an example of GUI of the image processing apparatus.

FIG. 11 is a view showing an example of a GUI (Graphical User Interface) of an image editing program in the image processing apparatus. A window has a close button 1100 and a title bar 1101. The program ends when the close button is clicked. A file is dragged and dropped in an image display region 1102 to designate a correction target image. When the correction target image is determined, the file name is displayed on the title bar 1101, and the target image is Fit-displayed in the image display region 1102. Dust removal processing (to be described later) is executed by clicking on an execute button 1103 so that a processed image is displayed in the image display region 1102. When a step execute button 1104 is clicked on, steps of the dust removal processing (to be described later) are executed. When the processing ends for all dust regions, the processed image is displayed in the image display region 1102. The processed image is stored by clicking on a save button 1105.

Figure 12:
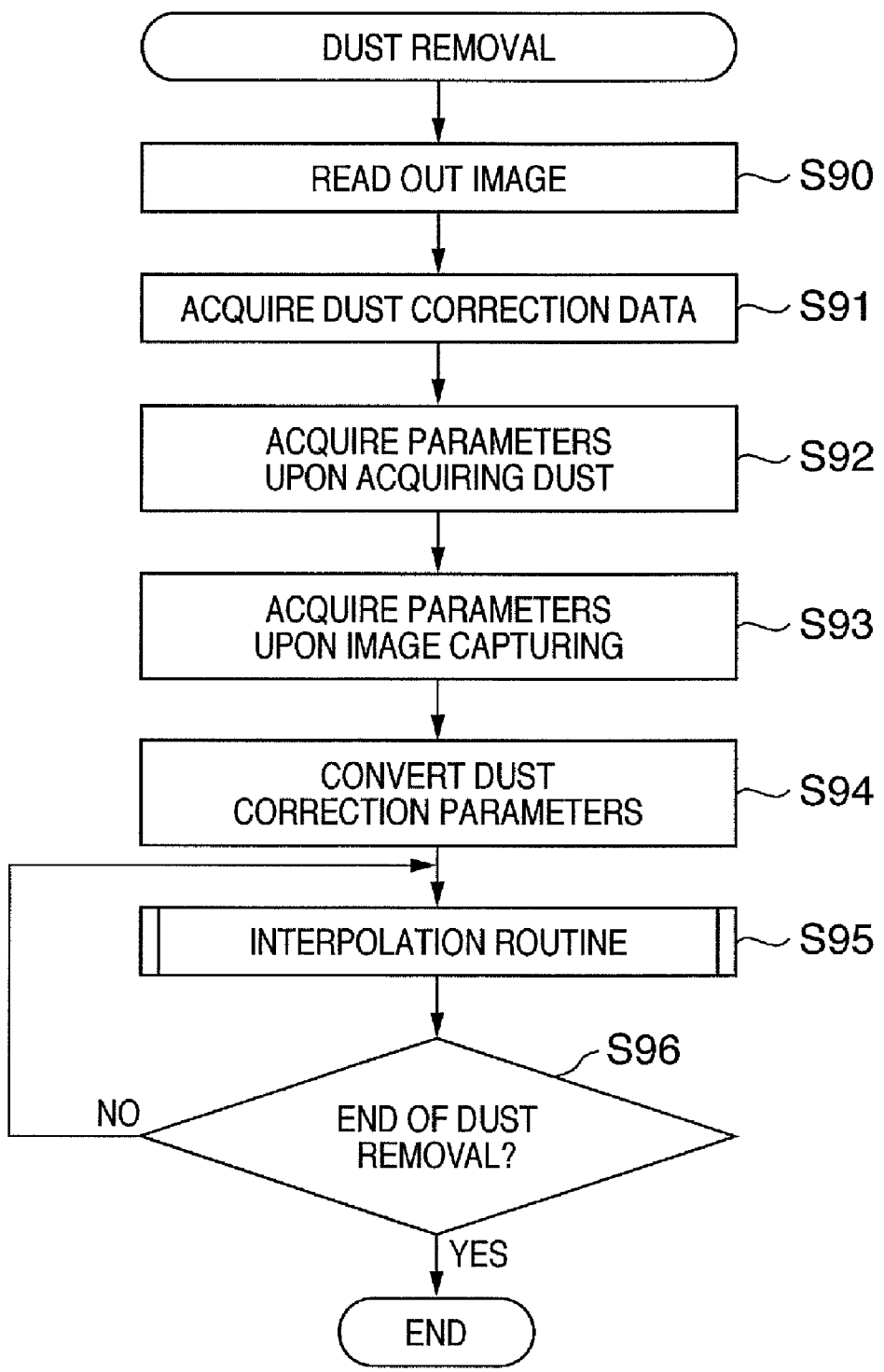
FIG. 12 is a flowchart for explaining details of dust removal processing.

FIG. 12 shows the procedure of dust removal processing by the image processing apparatus.

The image processing apparatus reads out normal captured image data with dust correction data from the digital camera or the storage device 419 detached from the digital camera and stores the data in the primary storage unit 1002 or secondary storage unit 1003 (step S90).

The dust correction data added to the captured image in step S208 is extracted from the normal captured image data (dust removal processing target) (step S91).

The coordinate sequence Di (i=0, 1, . . . , n), radius sequence Ri (i=0, 1, . . . , n), aperture value f1, and lens pupil position L1 are obtained from the dust correction data extracted in step S91 (step S92). Ri is the size of dust at the coordinates Di calculated in step S65 of FIG. 6. In step S93, an aperture value f2 and a lens pupil position L2 upon normal image capturing are acquired. In step S94, Di is converted using the following expression, where d is the distance from the image center to the coordinates Di, H is the distance between the dust and the surface of the image sensor 418. Coordinates Di' after conversion and radius Ri' after conversion are defined, for example, by the following equations.

$$Di'(x,y)=(L2\times(L1-H)\times d/((L2-H)\times L1))\times Di(x,y)$$

$$Ri=(Ri\times f1/f2+3) \quad (1)$$

The unit is "pixels", and "+3" for Ri' is the margin amount.

In step S95, dust in the region represented by the coordinates Di' and radius Ri' is detected, and interpolation processing is applied as needed. The interpolation processing will be described later in detail. In step S96, it is determined whether dust removal processing is applied to all coordinates. If the processing is complete for all coordinates, the processing ends. Otherwise, the process returns to step S95.

(Interpolation Routine)

Figure 13:
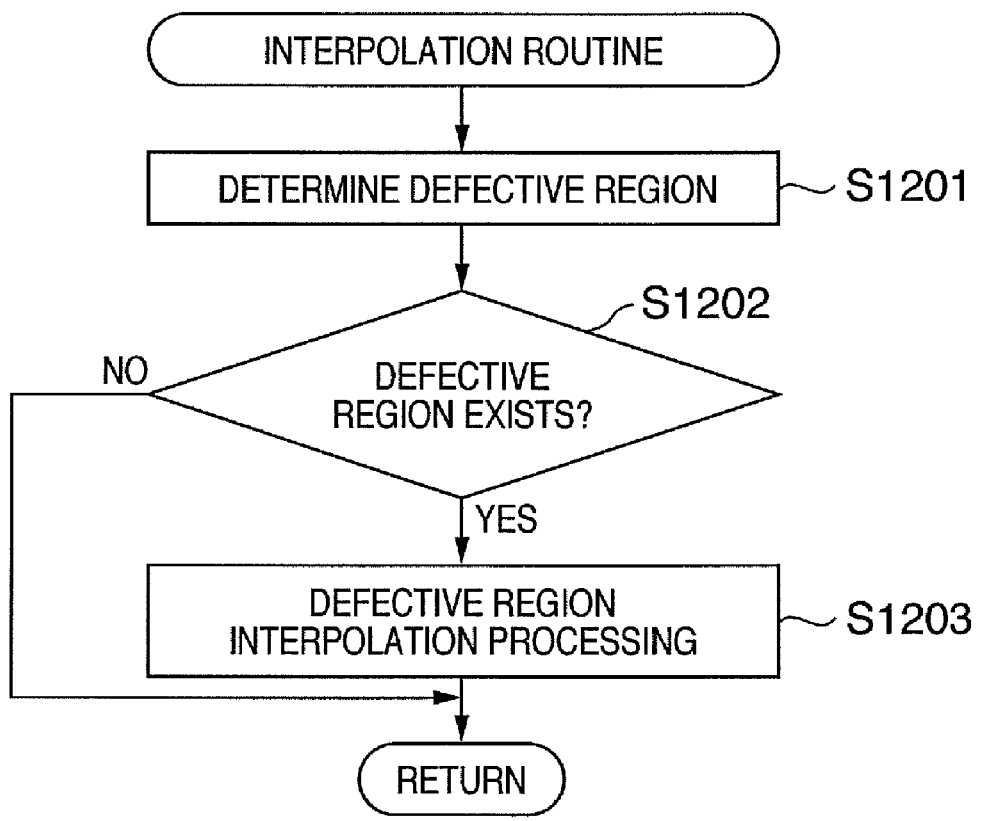
FIG. 13 is a flowchart for explaining details of an interpolation routine.

Interpolation processing of a dust region will be described next in detail. FIG. 13 is a flowchart showing the procedure of the interpolation routine. In step S1201, dust region determination is performed. A dust region is a region that satisfies all of the following conditions.

(1) A region having a brightness value smaller than a threshold value T2 which is obtained using $$T2=Yave\times0.6+Ymax\times0.4$$

where Yave is the average brightness, and Ymax is the maximum brightness of pixels included in a region represented by the central coordinates Di' and radius Ri' (Di' and Ri' obtained by equation (1)) calculated in step S94 of FIG. 12.

(2) A region that does not contact the circle represented by the central coordinates Di' and radius Ri'.

Figure 6:
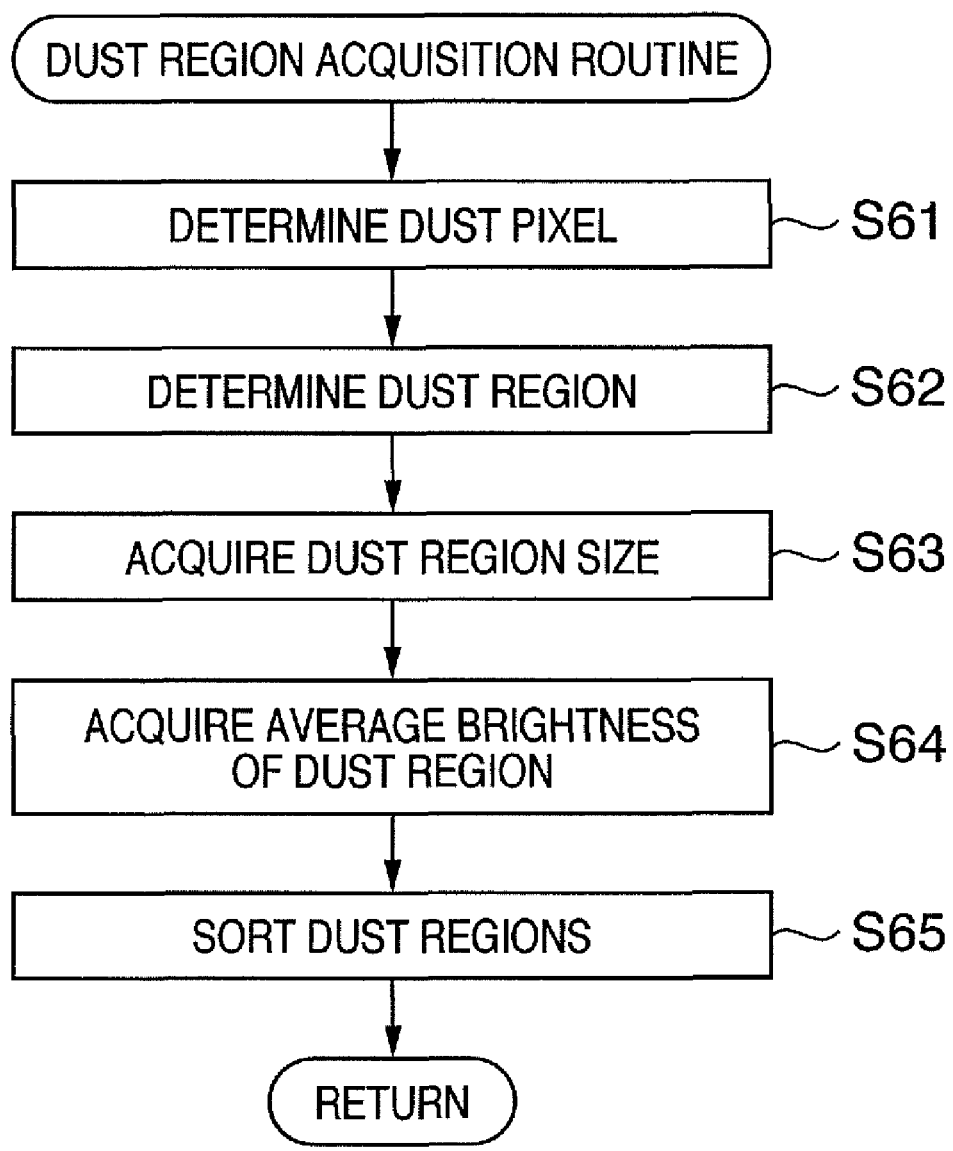
FIG. 6 is a flowchart for explaining details of a dust region acquisition routine in step S27 of FIG. 4.

(3) A region whose radius value is calculated in accordance with the same procedure as in step S63 of FIG. 6 is 11 (inclusive) to 12 (exclusive) in an isolated region including low-brightness pixels selected by (1).

(4) A region including the central coordinates Di of the circle.

In this embodiment, l1 is three pixels, and l2 is 30 pixels. This allows handling of only an isolated, small region as a dust region. If it is impossible to accurately acquire the lens pupil position, condition (4) may appropriately be modified. For example, a region of interest, which includes coordinates within the range of ±3 pixels in the X and Y directions from the coordinates Di, may be determined as a dust region.

If such a region exists in step S1202, the process advances to step S1203 to execute dust region interpolation. If no region exists, the processing ends. The dust region interpolation processing in step S1203 is executed by a known defective region interpolation method. An example of the known defective region interpolation method is pattern replacement, disclosed in Japanese Patent Laid-Open No. 2001-223894. The method of Japanese Patent Laid-Open No. 2001-223894 specifies a defective region by using infrared light. In this embodiment, the dust region detected in step S1201 is handled as a defective region, and pattern replacement is executed to interpolate the dust region using normal pixels in the neighborhood. For a pixel that is not obtained by pattern replacement, p normal pixels are selected in ascending order of distance from the interpolation target pixel in the image data after pattern replacement, and interpolation is executed using the average color of the pixels.

As described above, since dust correction data is attached to image data, the user need not be aware of the correspondence between dust correction image data and captured image data. Since the dust correction data containing the position, size, and conversion data (aperture value and distance information of the lens pupil position) is compact, the captured image data size can be prevented from increasing excessively. It is also possible to greatly reduce the detection error probability by interpolating only a region including pixels designated by the dust detection processing.

Second Embodiment

In the first embodiment, not the camera body but the separately prepared image processing apparatus executes dust removal processing. In the second embodiment, a method of causing the camera body to execute dust removal processing will be described. A digital camera according to the second embodiment has the same arrangement as in the first embodiment, and a description thereof will be omitted. Only operations different from the first embodiment will be described.

(Dust Removal Routine)

The dust removal routine of the digital camera according to this embodiment executes the same processing as in the flowchart of FIG. 12. This processing is done by causing a microcomputer 402 to execute a dust removal processing program stored in a memory 428.

When the user inputs a dust removal processing start instruction from, for example, a cursor switch 116, the microcomputer 402 loads, to an image processing circuit 425, data corresponding to each pixel of a captured image stored in an image buffer memory 424. The image processing circuit 425 executes the processing shown in FIG. 12 to interpolate dust pixels. The interpolation processing result is recorded in a storage device 419 as a new image file.

The processing in FIG. 12 has already been explained in detail in the first embodiment, and a description thereof will be omitted here.

As described above, according to the above embodiment, the user can properly remove dust without being aware of the correspondence between dust detection image data and normal captured image data. It is also possible to attach data without greatly increasing the image data file size even when embedding dust correction data in an image.

Other Embodiment

The object of the embodiments is also achieved by the following method. A storage medium (or recording medium), which records software program codes to implement the functions of the above-described embodiments, is supplied to a system or apparatus. The computer (or CPU or MPU) of the system or apparatus reads out and executes the program codes stored in the storage medium. In this case, the program codes read out from the storage medium themselves implement the functions of the above-described embodiments. The functions of the above-described embodiments are implemented not only by causing the computer to execute readout of the program codes. The present invention can also be embodied in the following arrangement. The operating system (OS) running on the computer wholly or partially executes actual processing on the basis of the instructions of the program codes, thereby implementing the functions of the above-described embodiments.

The present invention can also be embodied in the following arrangement. The program codes read out from the storage medium are written in the memory of a function expansion card inserted into the computer or a function expansion unit connected to the computer. The CPU of the function expansion card or function expansion unit wholly or partially executes actual processing on the basis of the instructions of the program codes, thereby implementing the functions of the above-described embodiments.

A storage medium that embodies the present invention is applied stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-005397, filed Jan. 12, 2006, which is hereby incorporated by reference herein in its entirety.

What is claimed is:

1. An image processing apparatus comprising:
    an information extraction unit configured to extract foreign substance information that is information of a position and size of a foreign substance in an image sensing plane of an image capture unit and is recorded in association with captured image data and first lens information of a lens used when acquiring the foreign substance information and second lens information of a lens used when acquiring the captured image data after acquiring the foreign substance information, which are recorded in association with the captured image data;
    a conversion unit configured to convert first position and first size of the foreign substance information extracted by said information extraction unit into second position and second size of foreign substance information on the basis of the first and second lens information extracted by said information extraction unit; and
    an interpolation unit configured to interpolate a pixel corresponding to the foreign substance in the captured image data on the basis of the second form of foreign substance information.

2. The apparatus according to claim 1, wherein the first and second lens information contain information of an aperture value and a pupil position of the lens when capturing an object.

3. An image processing method comprising steps of:
    extracting foreign substance information which is information regarding the position and size of a foreign substance in an image sensing plane of image capture unit and is recorded in association with captured image data and first lens information of a lens used when acquiring the foreign substance information and second lens information of a lens used when acquiring the captured image data after acquiring the foreign substance information, which are recorded in association with the captured image data;
    converting first position and first size of the foreign substance information extracted in the information extracting step into second position and second size of foreign substance information on the basis of the first and second lens information extracted in the information extracting step; and
    interpolating a pixel corresponding to the foreign substance in the captured image data on the basis of the second foreign substance information form.

4. The method according to claim 3, wherein the first and second lens information contain information of an aperture value and a pupil position of the lens when capturing an object.

5. A non-transitory computer readable storage medium storing a program causing a computer to execute an image processing method of claim 3.

* * * * *